UNITED STATES PATENT OFFICE.

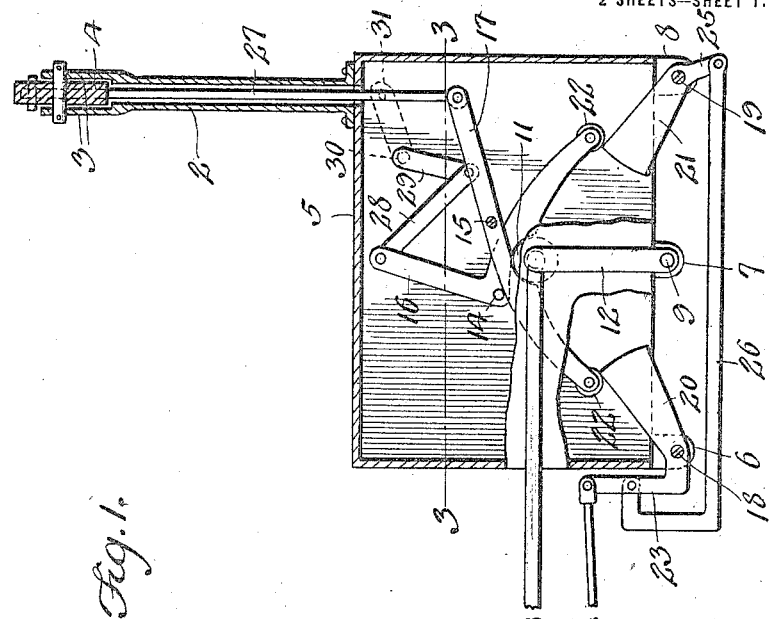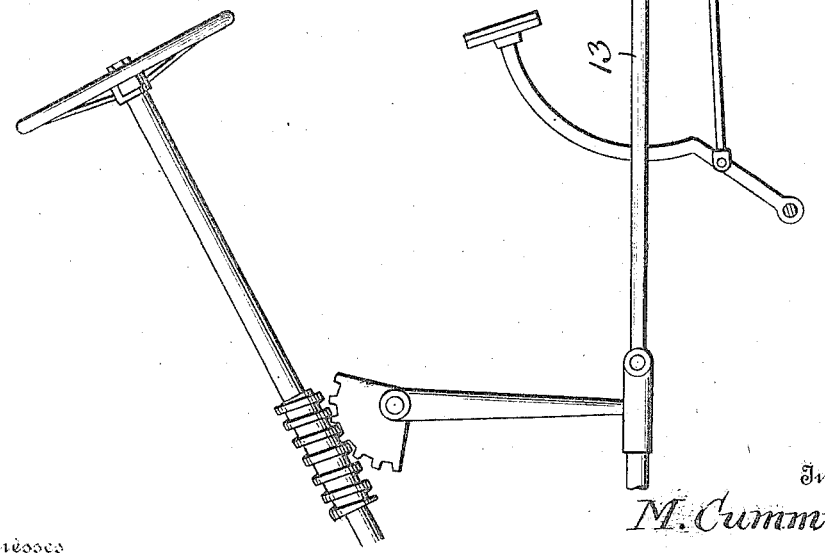

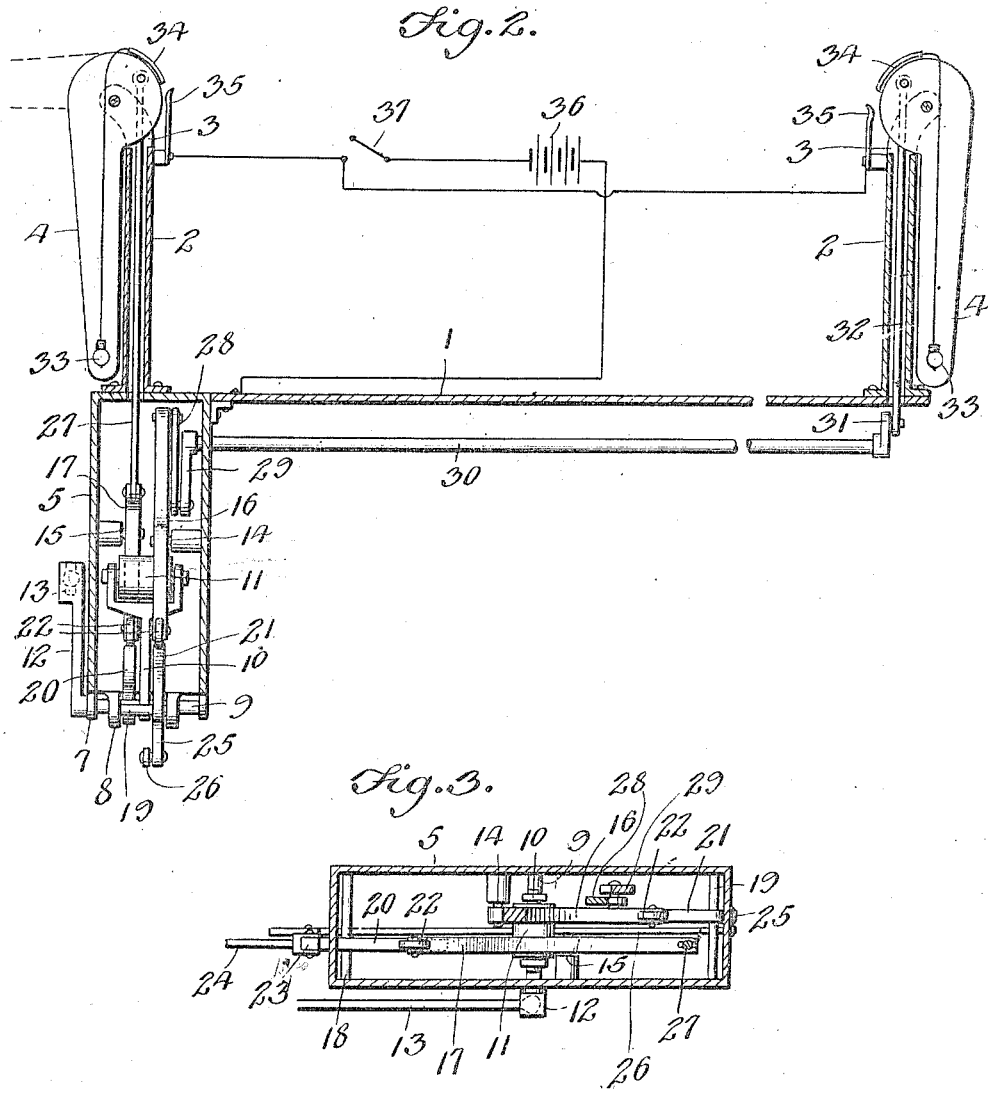

MARK CUMMINS, OF JEFFERSON, OHIO.

SIGNAL APPARATUS FOR VEHICLES.

1,238,004.  Specification of Letters Patent.  Patented Aug. 21, 1917.

Application filed March 14, 1916. Serial No. 84,170.

*To all whom it may concern:*

Be it known that I, MARK CUMMINS, a citizen of the United States, residing at Jefferson, in the county of Ashtabula and State of Ohio, have invented new and useful Improvements in Signal Apparatus for Vehicles, of which the following is a specification.

This invention relates to improvements in signaling apparatus for vehicles and has particular application to automatic signaling apparatus.

In carrying out the present invention, it is my purpose to provide automatic signaling apparatus which may be used upon automobiles, street cars, railroad cars and other vehicles and which will operate automatically to indicate when the operator of the signal equipped vehicle is about to stop and, in the case of automobiles and other motor vehicles, when the signal equipped vehicle is about to make a turn to the right or left.

With the above and other objects in view, the invention consists in the construction, combination and arrangement of parts hereinafter set forth in and falling within the scope of the claims.

In the accompanying drawings;

Figure 1 is a diagrammatic side elevation of signaling apparatus constructed in accordance with the present invention, the same being shown as applied to a motor vehicle, parts being shown in section.

Fig. 2 is an end view of the same, partly diagrammatic and partly in section.

Fig. 3 is a horizontal sectional view on the line 3—3 of Fig. 1.

Referring now to the drawings in detail, 1 designates a base plate which may be arranged across the back of a motor vehicle. Secured to the base plate 1 adjacent to the respective ends thereof and projecting upwardly therefrom are tubes 2, 2 and formed on the upper ends of the tubes are outwardly curved arms 3. Pivoted upon the arms 3 are signal blades 4 normally disposed in vertical position and lying alongside of the respective tubes and capable of swinging movement to horizontal position. Fastened to the bottom of the base plate 1 below one of the tubes 2 is a casing 5 having the lower end open. Formed integral with the lower edges of the side walls of the casing 5 are pairs of bearing lugs 6, 7 and 8. The lugs 6 and 8 are arranged adjacent to the end walls of the casing, while the lugs 7 are disposed between the lugs 8 and journaled in the lugs 7 is a pivot rod 9 upon which is pivoted the lower end of a vertical arm 10 projecting upwardly into the casing 5 and rotatably mounted upon the upper end of the arm 10 is a roller 11. This arm 10 is normally disposed in a vertical position and is capable of swinging movement to one side or the other of the vertical position. Fixed upon one end of the shaft 9 and projecting upwardly therefrom parallel with the arm 10 is a connecting arm 12 arranged upon the outer side of the casing 5 and the upper end of the connecting arm 12 is connected through the medium of a rod 13 with the lower end of the steering arm of the motor vehicle, as clearly shown in Fig. 1 of the drawings, so that upon the turning of the steering column to turn the steering wheel in one direction or the other, the rod 13 will be pulled or pushed with the effect to rotate the shaft 9 and swing the arm 10 in a direction corresponding to the movement of the steering wheel. Extending across the casing 5 and suitably secured to the side walls thereof are pivot rods 14, 15 arranged above the arm 10 and disposed upon opposite sides of the normal position of the arm and pivoted upon the rod 14 is an angle lever 16 having one leg projecting upwardly and the other leg curved and projecting downwardly over the roller 11 on the arm 10. Pivoted between its ends upon the rod 15 is a lever 17 having one end projecting toward the end wall of the casing adjacent to the lower curved leg of the lever 16 and the other end curved and projecting downwardly toward the other end wall of the casing and intersecting the lower leg of the lever 16 at a point above the roller 11 on the arm 10. The edges of the levers 16 and 17 in juxtaposition to the roller 11 are cut out to conform to the curvature of the roller so that the latter may be disposed in such cut out portions when the arm is in normal position. Journaled in the ears 6 and 8 are shafts 18 and 19 respectively and fixed upon the shafts 18 and 19 are operating arms 20 and 21 projecting into the casing 5 below and at the inner side of the lower ends of the levers 17 and 16 respectively and journaled in the lower ends of these levers 17 and 16 are bearing rollers 22. Fixed upon the shaft 18 is a connecting arm 23 connected through the medium of a rod 24 with the brake pedal or lever of the motor vehicle as clearly illustrated in Fig. 1 of the drawings. Depending from the shaft 19 and fixed thereto is a connecting arm 25 and interconnecting the arms 23 and 25 is a rod 26, whereby motion may be transmitted from the arm 23 to the arm 25 in the operation of the arm 23 by the rod 24.

The upper end of the lever 17 terminates below and in line with the adjacent tube 2 and is connected through the medium of a rod 27 with the signal blade 4 pivoted on the upper end of such tube, while the upper end of the lever 16 is connected through the medium of a link 28 with an arm 29 fixed upon one end of a shaft 30 journaled in suitable bearings and projecting from the casing 5 toward the remote tube 2. The end of the shaft 30 remote from the casing 5 is disposed below and in line with the tube 2 and mounted upon such end of the shaft 30 is a crank arm 31 connected through the agency of a rod 32 with the signal blade 4 upon the sleeve 2 above the crank end of the shaft 30.

In practice, when the arm 10 is swung in one direction, the roller 11 rides upon the lower portion of the lever 17 and swings the lower end of such lever upwardly and the upper end downwardly thereby pulling the rod 27 to swing the signal blade 4 from vertical position to horizontal position to indicate the direction in which the vehicle is about to turn. On the other hand, when the arm 10 is swung in the other direction, the roller 11 rides upon the lower portion of the lever 16 and swings the upper end of the lever 16 with the effect to rotate the shaft 30 through the medium of the link 28 and the arm 29 and in this movement of the shaft 30 the crank arm 31 and the remote end thereof actuates the rod 32 to swing the other arm 4 to indicate that the vehicle is about to turn in the other direction.

When the brake pedal or brake lever is swung to apply the brakes, the arms 20 and 21 are actuated simultaneously and engage the lower end of the levers 17 and 16, thereby swinging the lower ends of such levers upwardly with the effect to swing both signal blades 4 from vertical position to horizontal position to indicate that the vehicle is about to stop.

In the present instance, the outer end of each signal blade 4 is equipped with a lamp 33 and one terminal of the lamp 33 is grounded upon the signal blade, while the other terminal is connected with a contact strip 34 carried by the inner end of the signal blade and insulated therefrom and adapted to engage a contact finger 35 carried by the upper end of the sleeve 32 and insulated therefrom. A battery 36 has one side connected with the contact fingers 35 and the other side grounded upon the base plate 1 and located in the connection between the battery and the fingers 35 is a controlling switch 37. At night, the switch 37 is closed and in the upward movement of either one of the arms 4 the contact strip 34 engages the corresponding finger 35, thereby closing the circuit of the lamp 33 and energizing the latter.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. In signal apparatus for motor vehicles, a base plate arranged across the vehicle, vertical tubes secured to said base plate adjacent to the ends thereof and projecting upwardly therefrom, signal blades pivoted on the upper ends of said tubes and normally lying alongside of said tubes in vertical position and capable of swinging movement to horizontal position, levers pivoted for swinging movement, connections between one end of each lever and a corresponding one of said signal blades, means adapted to engage the remaining ends of said levers separately to operate the latter to swing the signal blades from vertical position to horizontal position, and means for engaging the remaining ends of said levers simultaneously to swing the latter to actuate said signal blades from vertical position to horizontal position.

2. In signal apparatus for motor vehicles, a base plate arranged across the vehicle, vertical tubes secured to such base plate adjacent to the ends thereof and projecting upwardly therefrom, signal blades pivoted on the upper end of said tubes and normally lying in inactive position, and capable of movement to active or signaling position, levers pivoted for swinging movement, connections between one end of each lever and a corresponding one of said signal blades, steering wheel controlled means adapted to engage the remaining ends of said levers separately to operate the latter to swing the signaling blades from non-signaling position to signaling position, brake pedal controlled means for engaging the remaining ends of said levers simultaneously to swing the latter to actuate said signaling blades to signaling position, and means for illuminating said signal blades.

In testimony whereof I affix my signature in presence of two witnesses.

MARK CUMMINS.

Witnesses:
G. L. BENNETT,
W. W. WOODBURY.